US008812573B2

(12) United States Patent
Langhammer

(10) Patent No.: US 8,812,573 B2
(45) Date of Patent: Aug. 19, 2014

(54) CALCULATION OF TRIGONOMETRIC FUNCTIONS IN AN INTEGRATED CIRCUIT DEVICE

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 659 days.

(21) Appl. No.: 13/159,614

(22) Filed: Jun. 14, 2011

(65) Prior Publication Data

US 2012/0054254 A1    Mar. 1, 2012

Related U.S. Application Data

(63) Continuation of application No. 12/823,539, filed on Jun. 25, 2010, now Pat. No. 8,589,463.

(51) Int. Cl.
  *G06F 7/38* (2006.01)
(52) U.S. Cl.
  USPC .......................................... 708/440; 708/235
(58) Field of Classification Search
  None
  See application file for complete search history.

(56) References Cited

U.S. PATENT DOCUMENTS

| 3,473,160 | A | 10/1969 | Wahlstrom |
| 3,896,299 | A | 7/1975 | Rhodes |
| 4,156,927 | A | 5/1979 | McElroy et al. |
| 4,179,746 | A | 12/1979 | Tubbs |
| 4,212,076 | A | 7/1980 | Conners |
| 4,215,406 | A | 7/1980 | Gomola et al. |
| 4,215,407 | A | 7/1980 | Gomola et al. |
| 4,422,155 | A | 12/1983 | Amir et al. |
| 4,484,259 | A | 11/1984 | Palmer et al. |
| 4,521,907 | A | 6/1985 | Amir et al. |
| 4,575,812 | A | 3/1986 | Kloker et al. |
| 4,597,053 | A | 6/1986 | Chamberlin |
| 4,616,330 | A | 10/1986 | Betz |
| 4,623,961 | A | 11/1986 | Mackiewicz |
| 4,682,302 | A | 7/1987 | Williams |
| 4,718,057 | A | 1/1988 | Venkitakrishnan et al. |
| 4,727,508 | A | 2/1988 | Williams |

(Continued)

FOREIGN PATENT DOCUMENTS

| EP | 0 158 430 | 10/1985 |
| EP | 0 380 456 | 8/1990 |

(Continued)

OTHER PUBLICATIONS

Altera Corporation, "Statix II Device Handbook, Chapter 6—DSP Blocks in Stratix II Devices," v1.1, Jul. 2004.

(Continued)

*Primary Examiner* — Michael D Yarry
(74) *Attorney, Agent, or Firm* — Ropes & Gray LLP; Jeffrey H. Ingerman

(57) ABSTRACT

Circuitry for computing a trigonometric function of an input includes circuitry for relating the input to another value to generate an intermediate value, circuitry for selecting one of the input and the intermediate value as a trigonometric input value, circuitry for determining respective initial values of a plurality of trigonometric functions for the trigonometric input value, and circuitry for deriving, based at least in part on a trigonometric identity, a final value of the first trigonometric function from the respective initial values of the plurality of trigonometric functions. The trigonometric function may be any of sine, cosine and tangent and their inverse functions. The trigonometric identities used allow a computation of a trigonometric function to be broken into pieces that either are easier to perform or can be performed more accurately.

36 Claims, 12 Drawing Sheets

(56) References Cited

U.S. PATENT DOCUMENTS

| | | |
|---|---|---|
| 4,736,335 A | 4/1988 | Barkan |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Benet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |

(56) References Cited

U.S. PATENT DOCUMENTS

| | | |
|---|---|---|
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,385,632 B1 | 5/2002 | Choe et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,203,718 B1 * | 4/2007 | Fu et al. .................. 708/622 |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,930,335 B2 | 4/2011 | Gura |
| 7,930,336 B2 | 4/2011 | Langhammer et al. |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2002/0129073 A1 | 9/2002 | Page et al. |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0131975 A1 * | 6/2005 | Okutani et al. ............ 708/400 |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |

(56) References Cited

U.S. PATENT DOCUMENTS

| | | |
|---|---|---|
| 2005/0262175 A1 | 11/2005 | Iino et al. |
| 2006/0020655 A1 | 1/2006 | Lin |
| 2006/0059215 A1 | 3/2006 | Maharatna et al. |
| 2007/0083585 A1 | 4/2007 | St Denis et al. |
| 2007/0124352 A1 | 5/2007 | Wittig |
| 2007/0185951 A1 | 8/2007 | Lee et al. |
| 2007/0185952 A1 | 8/2007 | Langhammer et al. |
| 2007/0241773 A1 | 10/2007 | Hutchings et al. |
| 2008/0133627 A1 | 6/2008 | Langhammer et al. |
| 2008/0183783 A1 | 7/2008 | Tubbs |
| 2009/0172052 A1 | 7/2009 | DeLaquil et al. |
| 2009/0187615 A1 | 7/2009 | Abe et al. |
| 2009/0300088 A1 | 12/2009 | Michaels et al. |
| 2010/0098189 A1 | 4/2010 | Oketani |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices," *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Amos, D., "PLD architectures match DSP algorithms " *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications, Roadmap to Reconfigurable Computing. 10th International Conference, FPL 2000. Proceedings (Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics* , 1999 , vol. E82C, No. 9, Sep. 1999, pp. 1687-1698.

Ashour, M.A., et al., "An FPGA implementation guide for some different types of serial-parallel multiplier-structures," *Microelectronics Journal* , vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffar, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Haynes, S.D., et al., "Configurable multiplier blocks for embedding in FPGAs," *Electronicas Letters*, vol. 34, No. 7, pp. 638-639 (Apr. 2, 1998).

Heysters, P.M., et al., "Mapping of DSP algorithms on field programmable function arrays," *Field-Programmable Logic and Applications, Roadmap to Reconfigurable Computing. 10th International Conference, FPL 2000. Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER ® Version 3.0*, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings (IEEE Cat. No. 96TH8140)*, Oct. 21-24, 1996, pp. 275-279.

Jones, G., "Field-programmable digital signal conditioning " *Electronic Product Design* vol. 21, No. 6, Jun. 2000, pp. C36-C38.

(56) References Cited

OTHER PUBLICATIONS

Kiefer, R., et al., "Performance comparison of software-FPGA hardware partitions for a DSP application," *14th Australian Microelectronics Conference, Microelectronics: Technology Today for the Future. MICRO '97 Proceedings*, Sep. 28-Oct. 1, 1997, pp. 88-93.

Kramberger, I., "DSP acceleration using a reconfigurable FPGA " *ISIE '99. Proceedings of the IEEE International Symposium on Industrial Electronics (Cat. No. 99TH8465)* vol. 3 , Jul. 12-16, 1999, pp. 1522-1525.

Langhammer, M., "How to implement DSP in programmable logic," *Elettronica Oggi*, No. 266 , Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)* vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference (Cat. No. 00EX404)*, Sep. 10-13, 2000, pp. 135-138.

Parhami, B., "Configurable arithmetic arrays with data-driven control, " *34th Asilomar Conference on Signals, Systems and Computers*, vol. 1, 2000, pp. 89-93.

"The QuickDSP Design Guide", Quicklogic, Aug. 2001, revision B. "QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications (Cat. No. 99EX303)* Jul. 26-28, 1999, pp. 147-150.

Texas Instruments Inc., "TMS320C54x DSP Reference Set, vol. 1: CPU and Peripherals", Literature Number: SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL '99, Proceedings (Lecture Notes in Computer Science* vol. 1673), Lysaght, P., et al., eds., Aug. 30-Sep. 1, 1999, pp. 264-273.

Tralka, C., " Symbiosis of DSP and PLD," *Elektronik*, vol. 49, No. 14 , Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems*, 1998, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1.

"Virtex-II 1.5V Field-Programmable Gate Arrays", *Xilinx*, Apr. 2, 2001, module 2.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik* vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx* Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca--aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Xilinx Inc., "Complex Multiplier v2.0", DS291 Product Specification/Datasheet, Nov. 2004.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," 3$^{rd}$ *International Conference on Design and Technology of Integrated Systems in Nanoscale Era*, 6 pgs., Mar. 2008.

Zhou, G. et al., "Efficient and High-Throughput Implementations of AES-GCM on FPGAs," *International Conference on Field-Programmable Technology*, 8 pgs., Dec. 2007.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Govindu, G. et al., "A Library of Parameterizable Floating-Point Cores for FPGAs and Their Application to Scientific Computing," *Proc Int'l Conf. Eng. Reconfigurable Systems and Algorithms (ERSA'*05) Jun. 2005.

Govindu, G. et al., "Analysis of High-performance Floating-point Arithmetic on FPGAs," *Proceedings of the 18$^{th}$ International Parallel and Distributed Processing Symposium (PDPS'*04), pp. 149-156, Apr. 2004.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference*, D5, Sep. 2003.

\* cited by examiner

US 8,812,573 B2

CALCULATION OF TRIGONOMETRIC FUNCTIONS IN AN INTEGRATED CIRCUIT DEVICE

CROSS REFERENCE TO RELATED APPLICATION

This is a continuation of commonly-assigned U.S. patent application Ser. No. 12/823,539, filed Jun. 25, 2010, now U.S. Pat. No. 8,589,463, which is hereby incorporated by reference herein in its entirety.

BACKGROUND OF THE INVENTION

This invention relates to calculating trigonometric functions in integrated circuit devices, and particularly in programmable integrated circuit devices such as programmable logic devices (PLDs).

Trigonometric functions are generally defined for the relatively small angular range of 0-360°, or 0-2π radians. For angular values above 2π, the values of the trigonometric functions repeat. Indeed, one could restrict the range to 0-π/2, because various trigonometric identities can be used to derive values for trigonometric functions of any angle between π/2 and 2π from trigonometric functions of angles between 0 and π/2.

One method that may be used in integrated circuit devices for calculating trigonometric functions is the CORDIC algorithm, which uses the following three recurrence equations:

$$x_{n+1} = x_n - d_n y_n 2^{-n}$$

$$y_{n+1} = y_n + d_n x_n 2^{-n}$$

$$z_{n+1} = z_n - d_n \tan^{-1}(2^{-n})$$

For example, to calculate a sine or cosine of an input, the x value is initialized to "1", the y value is initialized to "0", and the Z value is initialized to the angle required. Z is then rotated towards zero, which determines the sign of $d_n$, which is ±1—if $z_n$ is positive, then so is $d_n$, as the goal is to bring z closer to 0; if $z_n$ is negative, then so is $d_n$, for the same reason. x and y represent the x and y components of a unit vector; as z rotates, so does that vector, and when z has reached its final rotation to 0, the values of x and y will have converged to the cosine and sine, respectively, of the input angle.

To account for stretching of the unit vector during rotation, a scaling factor is applied to the initial value of x. The scaling factor is:

$$\prod_{n=0}^{\infty} \sqrt{1+2^{-2n}} = 1.64676025812106564 \ldots$$

The initial x is therefore be set to $1/1.64677\ldots = 0.607252935\ldots$.

However, CORDIC may become inaccurate as the inputs become small. For example, the actual value of $\sin(\theta)$ approaches $\theta$ as $\theta$ approaches 0 (and therefore $\sin(\theta)$ approaches 0), and the actual value of $\cos(\theta)$ approaches 1 as $\theta$ approaches 0. However, the magnitude of the error between the calculated and actual values increases as $\theta$ decreases.

Moreover, while CORDIC on initial consideration appears to be easily implemented in integrated circuit devices such as FPGAs, closer analysis shows inefficiencies, at least in part because of multiple, deep arithmetic structures, with each level containing a wide adder. Common FPGA architectures may have 4-6 input functions, followed by a dedicated ripple carry adder, followed by a register. When used for calculating floating point functions, such as the case of single precision sine or cosine functions, the number of hardware resources required to generate an accurate result for smaller input values can become large.

SUMMARY OF THE INVENTION

According to embodiments of the present invention, different trigonometric functions may be computed using various modified implementations that are based on different trigonometric identities that can be applied.

For sine and cosine functions, a modified CORDIC implementation changes small input angles to larger angles for which the CORDIC results are more accurate. This may be done by using $\pi/2-\theta$ instead of $\theta$ for small $\theta$ (e.g., for $\theta<\pi/4$). As discussed above, CORDIC accuracy suffers for smaller angles, but a standard CORDIC implementation may be used for larger angles. A multiplexer can select between the input value $\theta$ and the output of a subtractor whose subtrahend and minuend inputs are, respectively, $\pi/2$ and the input value $\theta$. A comparison of the input $\theta$ to a threshold can be used to control the multiplexer to make the selection. Both sine and cosine are computed by the x and y datapaths of the CORDIC implementation and the desired output path can be selected using another multiplexer, which may be controlled by the same comparison output as the input multiplexer. When $\pi/2-\theta$ has been used as the input, the identities $\cos(\theta)=\sin(\pi/2-\theta)$ and $\sin(\theta)=\cos(\pi/2-\theta)$ can be used to derive the desired result.

For the tangent function, the input angle can be broken up into the sum of different ranges of bits of the input angle, using trigonometric identities for the tangent of a sum of angles. Because some of the component ranges will be small, the identities will be simplified relative to those component ranges. The identities can be implemented in appropriate circuitry.

For the inverse tangent (i.e., arctan or $\tan^{-1}$) function, the problem is that the potential input range is between negative infinity and positive infinity (unlike, e.g., inverse sine or inverse cosine, where the potential input range is between −1 and +1). In accordance with the invention, trigonometric identities involving the inverse tangent function can be used to break up the input into different ranges, with the most complicated portion of the identity having a contribution below the least significant bit of the result, so that it can be ignored. The identities can be implemented in appropriate circuitry.

For inverse cosine (i.e., arccos or $\cos^{-1}$), the following identity may be used:

$$\arccos = 2\arctan\left(\frac{\sqrt{1-x^2}}{1+x}\right),$$

which may be reduced to:

$$\arccos = 2\arctan\left(\frac{1-x}{\sqrt{1-x^2}}\right).$$

The inverse tangent portion may be calculated as discussed above, simplified because the input range for inverse cosine is limited to between 0 and 1. Known techniques may be used to calculate the inverse square root. For inverse sine (i.e., arcsin or $\sin^{-1}$), which also has an input range limited to between 0 and 1, the inverse cosine can be calculated and then subtracted from $\pi/2$, based on the identity $\arcsin(x)=\pi/2-\arccos(x)$.

Therefore, in accordance with the present invention there is provided circuitry for computing a trigonometric function of an input. The circuitry includes circuitry for relating the input to another value to generate an intermediate value, circuitry for selecting one of the input and the intermediate value as a trigonometric input value, circuitry for determining respective initial values of a plurality of trigonometric functions for the trigonometric input value, and circuitry for deriving, based at least in part on a trigonometric identity, a final value of the first trigonometric function from the respective initial values of the plurality of trigonometric functions.

A corresponding method for configuring an integrated circuit device as such circuitry is also provided. Further, a machine-readable data storage medium encoded with instructions for performing the method of configuring an integrated circuit device is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

As discussed above, in a standard CORDIC implementation:

$$x_{n+1}=x_n-d_ny_n2^{-n}$$

$$y_{n+1}=y_n+d_nx_n2^{-n}$$

$$z_{n+1}=z_n-d_n\tan^{-1}(2^{-n})$$

As can be seen from these equations, at the first level (for n=0):

$$x_1=x_0-y_0$$

$$y_1=y_0+x_0$$

$$z_1=z_0-\tan^{-1}(1)$$

Similarly, at the second level (for n=1):

$$x_2=x_1-d_1(y_1/2)$$

$$y_2=y_1-d_1(x_1/2)$$

$$z_2=z_1-d_1\tan^{-1}(0.5)$$

It will be understood that this continues for additional n until $z_n$ converges to 0, or as close to 0 as required by a particular implementation. However, as discussed above, the accuracy of a CORDIC implementation decreases as the input angle becomes small.

Figure 1:
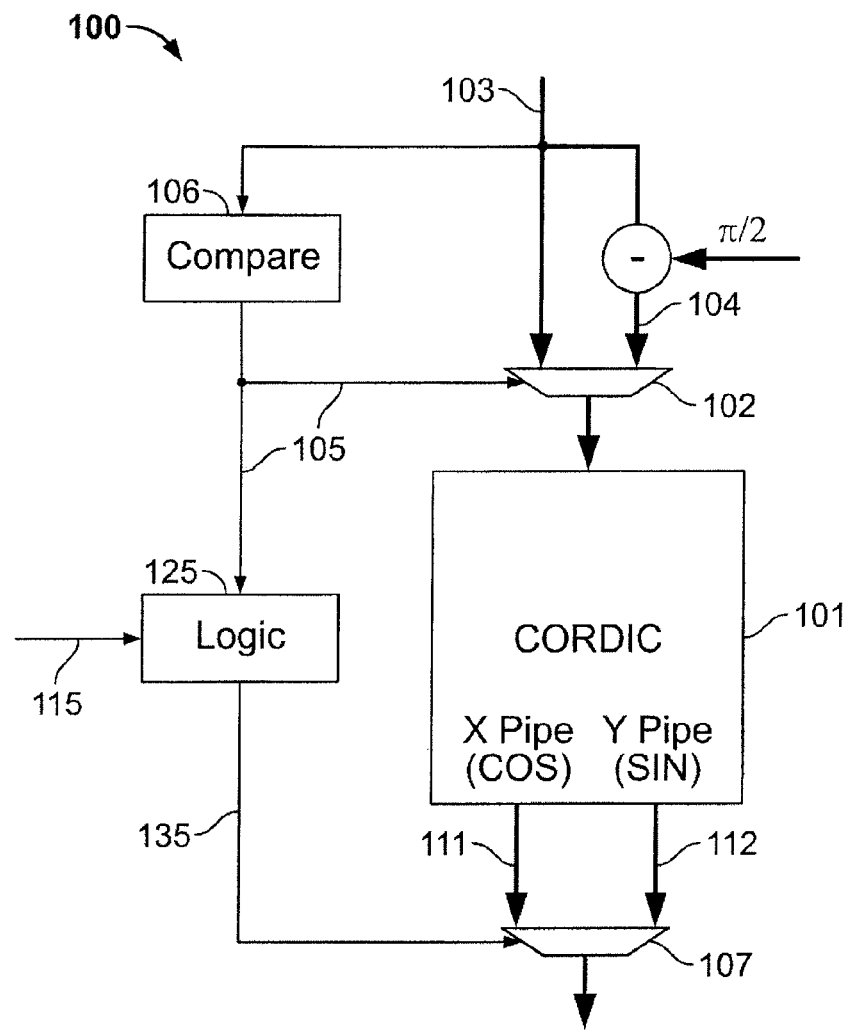
FIG. 1 shows a first embodiment of a CORDIC implementation for calculating sine and/or cosine in accordance with the present invention.

A logical structure 100 of a first embodiment according to the present invention for implementing CORDIC for sine or cosine is shown in FIG. 1. Structure 100 may be implemented as circuitry. Structure 100 is built around a CORDIC engine 101 which may be any suitable CORDIC engine, including that described in copending, commonly-assigned U.S. application Ser. No. 12/722,683, filed Mar. 12, 2010, which is hereby incorporated by reference herein in its entirety. CORDIC engine 101 provides an x output 111 which generally represents the cosine of the input, as well as a y output 112 which generally represents the sine of the input.

Input multiplexer 102 selects either the input variable 103, or difference 104 between $\pi/2$ and input variable 103. The control signal 105 for input multiplexer 102 result from a comparison 106 that which indicate(s) whether input variable 103 ($\theta$) is greater than $\pi/4$ or less than $\pi/4$ (or whatever other threshold may be selected). Because input variable 103 preferably is expressed a fraction (impliedly multiplied by $\pi/2$), the comparison may be performed simply by examining one or more of the most significant bits of input variable 103. Alternatively, a more complex comparison may be made.

In any event, the value passed to CORDIC engine is either $\theta$ or $\pi/2-\theta$, depending on whether $\theta$ is greater than (or equal to) or less than $\pi/4$.

The same control signal 105 that determines the input to CORDIC engine 101 helps to determine which output 111, 121 is selected by output multiplexer 107. Specifically, $\cos(\theta)=\sin(\pi/2-\theta)$ and $\sin(\theta)=\cos(\pi/2-\theta)$. Additional input 115 may be provided that represents whether the desired output is sine or cosine, and that input is combined at 125 with input 105, to provide a control signal 135, so that if input variable 103 ($\theta$) was used as the CORDIC input directly, then output 111 is selected if the desired function is cosine and output 112 is selected if the desired function is sine. But if difference 104

($\pi/2-\theta$) was used as the CORDIC input, then output 112 is selected if the desired function is cosine and output 111 is selected if the desired function is sine.

Figure 2:
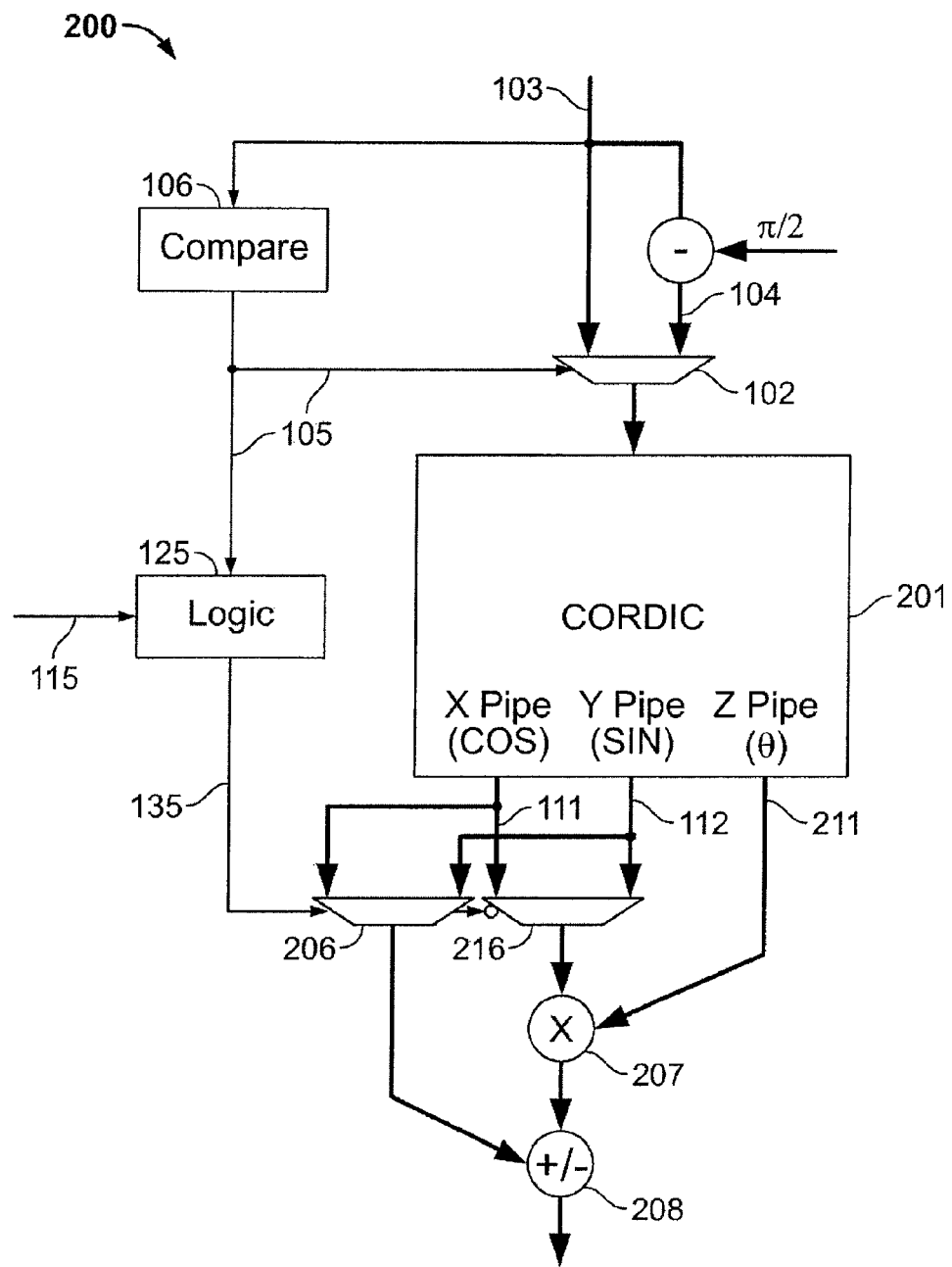
FIG. 2 shows a second embodiment of a CORDIC implementation for calculating sine and/or cosine in accordance with the present invention.

Known techniques for speeding up CORDIC calculations can be used. For example, once about halfway through the CORDIC calculation of a sine value, the final value of y can be approximated by multiplying the then-current value of x by the then-current value of z, and then subtracting that product from the then-current value of y. Similarly, for cosine, the final value of x can be approximated by multiplying the then-current value of y by the then-current value of z and adding that product to the then-current value of x. This may be referred to as "terminated CORDIC." FIG. 2 shows a modified CORDIC structure 200 that implements terminated CORDIC in accordance with an embodiment of the invention. Structure 200 may be implemented as circuitry.

The input stage of structure 200 is identical to that of structure 100, including input multiplexer 102, input variable 103, difference 104, comparison circuit 106 and control signal 105. CORDIC engine 201 may be the same as CORDIC engine 101, except that the z datapath is used as an output 211, in addition to outputs 111, 121.

However, the output stage of structure 200 differs from the output stage of structure 100. Instead of one output multiplexer 106, there is a first output multiplexer 206 controlled by signal 135 and a second output multiplexer 216 controlled by the inverse of signal 135. For cosine, this arrangement provides x directly to adder/subtractor 208, and provides y and z to multiplier 207, which provides its output to adder/subtractor 208. For sine, this arrangement provides y directly to adder/subtractor 208, and provides x and z to multiplier 207, which provides its output to adder/subtractor 208.

In some embodiments, structure 100 or 200 may be implemented in a programmable device, such as an FPGA, either in programmable logic, or in a combination of programmable logic and fixed logic (e.g., adders and/or multipliers) if provided. For example, FPGAs in the STRATIX® family of FPGAs available from Altera Corporation, of San Jose, Calif., include digital signal processing blocks having multipliers and adders and programmable interconnect for connecting the multipliers and adders. Such an FPGA may be configured to use the adders and/or multipliers, as well as any programmable logic that may be needed, to implement structure 100 or 200.

Figure 3:
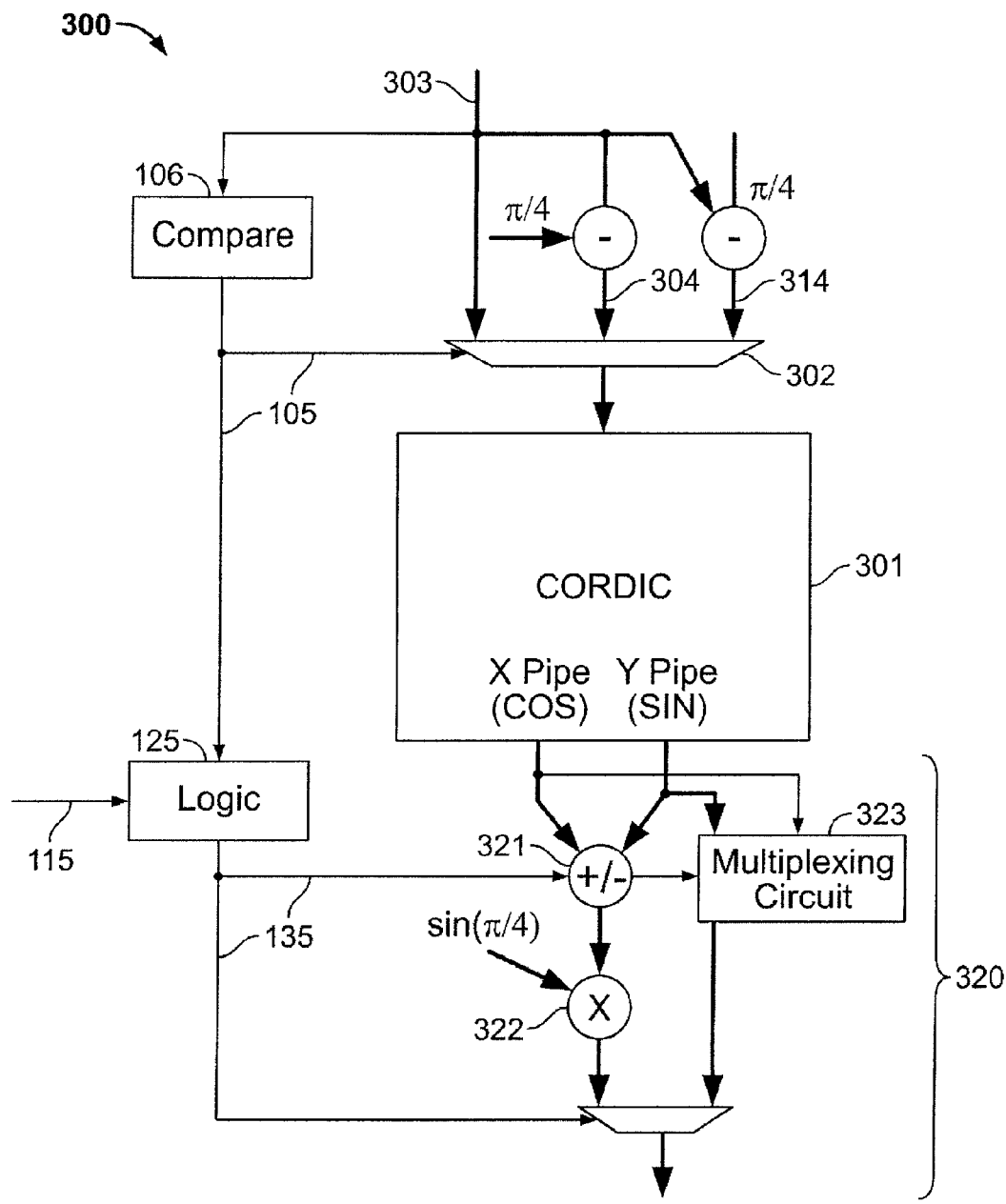
FIG. 3 shows a third embodiment of a CORDIC implementation for calculating sine and/or cosine in accordance with the present invention.

The input range can be further limited to a smaller range between $\pi/8$ and $\pi/4$, which may provide a more accurate CORDIC result than a range between $\pi/4$ and $\pi/2$. According to such an implementation, which may be carried out using a structure 300 as shown in FIG. 3, which may be implemented as circuitry, when the input is between 0 and $\pi/8$, the input is subtracted from $\pi/4$, creating a new value between $\pi/8$ and $\pi/4$. When the input is between $3\pi/8$ and $\pi/2$, $\pi/4$ is subtracted from the input, also creating a new value between $\pi/8$ and $\pi/4$. If the input is between $\pi/8$ and $3\pi/8$, the input may be passed through unchanged.

As seen in FIG. 3, input multiplexer 302 selects either input 303, or the difference 304 between $\pi/4$ and input 303, or the difference 314 between input 303 and $\pi/4$. The selected input is used in CORDIC engine 301 which may be substantially identical to CORDIC engine 101.

For the case where difference 304 is used, the outputs of CORDIC engine 301 are processed by output stage 320 in accordance with the following identities:

$$\sin(A-B)=\sin(A)\cos(B)-\sin(B)\text{COS}(A)$$

$$\cos(A-B)=\cos(A)\cos(B)+\sin(A)\sin(B)$$

If $A=\pi/4$, and $B=\pi/4-\theta$, then $A-B=\pi/4-(\pi/4-\theta)=\theta$. Also, $\text{SIN}(\pi/4)=\text{COS}(\pi/4)=2^{-0.5}$.

It follows, then, that:

$$\begin{aligned}\text{SIN}(\theta) &= \text{SIN}(A-B)\\ &= \text{SIN}(\pi/4)\text{COS}(\pi/4-\theta) -\\ &\quad \text{SIN}(\pi/4-\theta)\text{COS}(\pi/4)\\ &= 2^{-0.5}(\text{COS}(\pi/4-\theta)-\text{SIN}(\pi/4-\theta)).\end{aligned}$$

Similarly:

$$\begin{aligned}\text{COS}(\theta) &= \text{COS}(A+B)\\ &= \text{COS}(\pi/4)\text{COS}(\pi/4-\theta)+\\ &\quad \text{SIN}(\pi/4-\theta)\text{SIN}(\pi/4)\\ &= 2^{-0.5}(\text{COS}(\pi/4-\theta)+\text{SIN}(\pi/4-\theta)).\end{aligned}$$

For the case where difference 314 is used, the outputs of CORDIC engine 301 are processed by output stage 320 in accordance with the following identities:

$$\sin(A+B)=\sin(A)\cos(B)+\sin(B)\text{COS}(A)$$

$$\cos(A+B)=\cos(A)\cos(B)-\sin(A)\sin(B)$$

If $A=\pi/4$, and $B=\theta-\pi/4$, then $A+B=\pi/4+(\theta-\pi/4)=\theta$. Again, $\text{SIN}(\pi/4)=\text{COS}(\pi/4)=2^{-0.5}$.

It follows, then, that:

$$\begin{aligned}\text{SIN}(\theta) &= \text{SIN}(A+B)\\ &= \text{SIN}(\pi/4)\text{COS}(\theta-\pi/4)+\\ &\quad \text{SIN}(\theta-\pi/4)\text{COS}(\pi/4)\\ &= 2^{-0.5}(\text{COS}(\theta-\pi/4)+\text{SIN}(\theta-\pi/4)).\end{aligned}$$

Similarly:

$$\begin{aligned}\text{COS}(\theta) &= \text{COS}(A+B)\\ &= \text{COS}(\pi/4)\text{COS}(\theta-\pi/4)-\\ &\quad \text{SIN}(\theta-\pi/4)\text{SIN}(\pi/4)\\ &= 2^{-0.5}(\text{COS}(\theta-\pi/4)+\text{SIN}(\theta-\pi/4)).\end{aligned}$$

This is implemented in output stage 320 by adder/subtractor 321 which adds the y (SIN) datapath to, or subtracts it from, the x (COS) datapath, and by multiplier 322 which multiplies that difference by $2^{-0.5}$ (indicated in FIG. 3 as $\text{SIN}(\pi/4)$). Output stage 320 also may include a multiplexing circuit 323 (similar to the combination of multiplexers 206, 216 in FIG. 2) for implementing the pass-through of the correct datapath (SIN or COS, depending on the desired function) for a case where the input 303 is between $\pi/8$ and $3\pi/8$ and was passed through input multiplexer 302 unchanged.

Thus, as compared to embodiment 100 of FIG. 1, only one additional subtractor and one additional constant multiplication are needed for increased accuracy.

Alternatively, if the input is between $\pi/4$ and $3\pi/8$, it also falls under embodiment 100 of FIG. 1, and it can be reflected around $\pi/4$ by subtracting the input from $\pi/2$, switching SIN and COS results to get the desired output. This also may be useful for implementing other types of algorithms to calculate SIN and COS values where a small input range can be used to improve the convergence rate.

Figure 4:
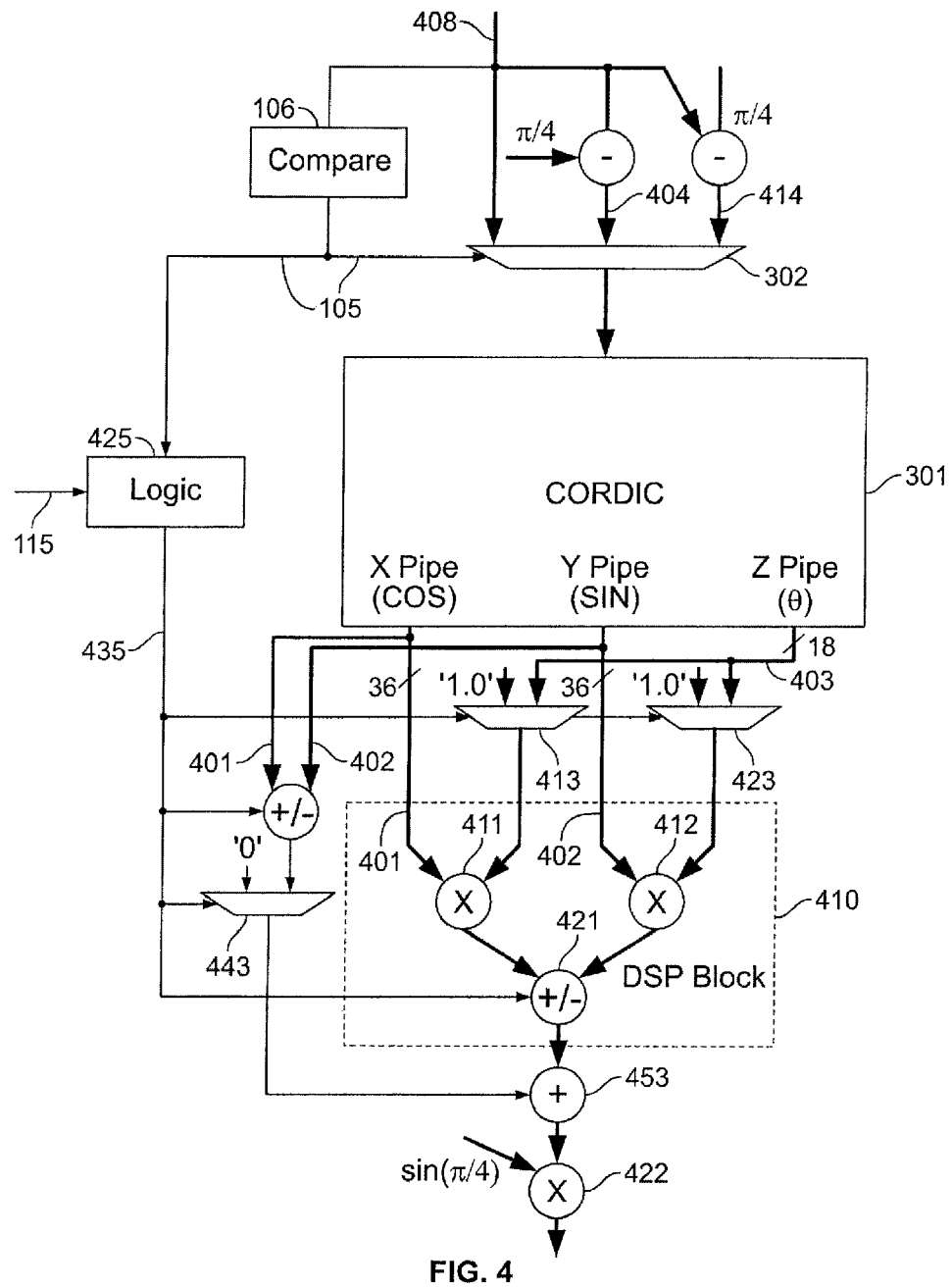
FIG. 4 shows a fourth embodiment of a CORDIC implementation for calculating sine and/or cosine in accordance with the present invention.

A "terminated CORDIC" implementation similar to embodiment 200 of FIG. 2 can be used with embodiment 300 of FIG. 3. Such an implementation 400 is shown in FIG. 4.

In a case where signal 105 selects the direct input 408, then, as in embodiment 200, only one of the SIN/COS datapaths 401, 402 is multiplied at 411, 412 by the z datapath 403 and then, at 421, is added to or subtracted from the other of the SIN/COS datapaths 401, 402, and that result is multiplied at 422 by $2^{-0.5}$. Whether datapath 401 or 402 is multiplied by datapath 403 is determined by signal(s) 435, output by logic 425 which, based on comparison signal 105 and signal 115 which indicates whether sine or cosine is desired, causes one of multiplexers 413, 423 to select datapath 403 for input to a respective one of multiplexers 411, 412, and other of multiplexers 413, 423 to select the value '1' for input to the other respective one of multiplexers 411, 412. In this case, signal(s) 435 also determines whether adder/subtractor 421 adds or subtracts, and causes multiplexer 443 to select the value '0' for addition at 453 to sum/difference 421. Sum 453 is then multiplied by $\sin(\pi/4)$ (i.e., $2^{-0.5}$) at 422.

In a case where signal 105 selects difference input 404 ($\pi/4-\theta$), because input 408 is less than $\pi/8$, then, depending on whether sine or cosine is desired, the following relationships, as discussed above, will apply:

$$\text{SIN}(\theta)=2^{-0.5}(\text{COS}(\pi4-\theta)-\text{SIN}(\pi/4-\theta))$$

$$\text{COS}(\theta)=2^{-0.5}(\text{COS}(\pi4-\theta)+\text{SIN}(\pi/4-\theta))$$

Similarly, in a case where signal 105 selects difference input 444 ($\theta-\pi/4$), because input 408 is greater than $3\pi/8$, then, depending on whether sine or cosine is desired, the following relationships, as discussed above, will apply:

$$\text{SIN}(\theta)=2^{-0.5}(\text{COS}(\theta4-\theta)-\text{SIN}(\theta-\pi/4))$$

$$\text{SIN}(\theta)=2^{-0.5}(\text{COS}(\theta4-\theta)+\text{SIN}(\theta-\pi/4))$$

In a terminated CORDIC implementation, $$\text{COS}(\phi)=x+yz$$

$$\text{SIN}(\phi)=y-xz$$

Therefore, in a terminated CORDIC case where signal 105 selects difference input 404 ($\pi/4-\theta$), $$\begin{aligned}\text{SIN}(\theta) &= 2^{-0.5}(x+yz-(y-xz))\\&=2^{-0.5}(x-y+(yz+xz))\\\text{COS}(\theta) &= 2^{-0.5}(x+yz+(y-xz))\\&=2^{-0.5}(x+y+(yz-xz))\end{aligned}$$

Similarly, in a terminated CORDIC case where signal 105 selects difference input 444 ($\theta-\pi/4$), $$\begin{aligned}\text{SIN}(\theta) &= 2^{-0.5}(x+yz+(y-xz))\\&=2^{-0.5}(x+y+(yz-xz))\\\text{COS}(\theta) &= 2^{-0.5}(x+yz-(y-xz))\\&=2^{-0.5}(x-y+(yz+xz))\end{aligned}$$

For these implementations, signal(s) 435 would cause both of multiplexers 413, 423 to select datapath 403 for input to multipliers 411, 412. Signal(s) 435 also would determine whether adders/subtractors 421 and 431 add or subtract, respectively, and would causes multiplexer 443 to select the sum/difference 431 for addition at 453 to sum/difference 421. Sum 453 is then multiplied by $\sin(\pi/4)$ (i.e., $2^{-0.5}$) at 422.

When implementing embodiment 400 in one of the aforementioned STRATIX® FPGAs, one of the aforementioned digital signal processing blocks, having multipliers and adders, can be used at 410 to provide multipliers 404, 405 and adder/subtractor 406. The digital signal processing blocks of such FPGAs, for example, are well-suited for performing two 36-bit-by-18-bit multiplications which may be used for this purpose. One such implementation is described at page 5-21 of the *Stratix III Device Handbook*, Volume 1 (ver. 2, March 2010), published by Altera Corporation, which is hereby incorporated by reference herein.

Other identity-based approaches can be used to simplify the calculations of other trigonometric functions.

For example, for $\tan(\theta)$, the normalized or range-reduced input is $-\pi/2\leq\theta\leq\pi/2$, while the output is between negative infinity and positive infinity. The following identity holds true for the tangent function:

$$\tan(a+b) = \frac{\tan(a)+\tan(b)}{1-\tan(a)\times\tan(b)}$$

By judiciously breaking up $\theta$, one can break up the problem of calculating $\tan(\theta)$ into easily calculable pieces. In this case, it may be advantageous to break up $\tan(\theta)$ into three pieces. This case be done by substituting c for b, and a+b for a, above. Thus:

$$\tan(a+b+c) = \frac{\tan(a+b)+\tan(c)}{1-\tan(a+b)\times\tan(c)}$$

Expanding further:

$$\tan(a+b+c) = \frac{\frac{\tan(a)+\tan(b)}{1-\tan(a)\times\tan(b)}+\tan(c)}{1-\left(\frac{\tan(a)\times\tan(b)}{1-\tan(a)\times\tan(b)}\right)\times\tan(c)}$$

Although this looks much more complex than the original identity, the properties of the tangent function, and the precision of single precision arithmetic, can be used to greatly simplify the calculation.

As with many trigonometric functions, $\tan(\theta)\approx\theta$ for small $\theta$. The input range for the tangent function is defined as $-\pi/2\leq\theta\leq\pi/2$. In single precision floating point arithmetic— e.g., under the IEEE754-1985 standard—the exponent is offset by 127 (i.e., $2^0$ becomes $2^{127}$). If the input exponent is 115 or less (i.e., a true exponent of $-12$ or less), the error between $\tan(x)$ and x is below the precision of the number format, therefore below that value, $\tan(\theta)$ can be considered equal to $\theta$.

The tangent function is therefore defined for a relatively narrow exponent range, between 115 and 127, or 12 bits of dynamic range. For IEEE754-1985 arithmetic, the precision is 24 bits. The input number can therefore be represented accurately as a 36-bit fixed point number (24 bits precision+ 12 bits range).

Such a 36-bit fixed point number can then be split into three components. If θ=a+b+c as indicated above, the upper 9 bits can be designated the c component, the next 8 bits can be designated the a component, and 19 least significant bits may be designated the b component.

As discussed above, tan(θ)=θ for any value of θ that is smaller than $2^{-12}$. As the 19 least significant bits of a 36-bit number, b is smaller than $2^{-17}$. Therefore, tan(b)=b and we can write:

$$\tan(a+b+c) = \frac{\frac{\tan(a)+b}{1-\tan(a)\times b} + \tan(c)}{1 - \left(\frac{\tan(a)+b}{1-\tan(a)\times b}\right)\times \tan(c)}$$

The tangent of a is relatively small. The maximum value of a is slightly less than $0.00390625_{10}$ (tan(a)=$0.00390627_{10}$) and the maximum value of b is $0.00001526_{10}$, which is also its tangent. Therefore, the maximum value of tan(a)×b is 5.96× $10^{-8}$, therefore the minimum value 1−tan(a)× b=$0.99999994_{10}$. The maximum value of tan(a)+b is $0.00392152866_{10}$. The difference between that value, and that value divided by the minimum value of 1−tan(a)×b is $2.35\times 10^{10}$, or about 32 bits, which is nearly the entire width of a, b and c combined. In the worst case, where c is zero, this error would not be in the precision of the result either, which is only 24 bits.

The foregoing equation therefore can be further simplified to:

$$\tan(a+b+c) = \frac{\tan(a)+b+\tan(c)}{1-(\tan(a)+b)\times \tan(c)}$$

Insofar as a and c are 8 and 9 bits respectively, the tangents for all possible bit combinations can be stored in a table with 36-bit data. Therefore the problem is reduced to a 36-bit fixed point multiplication, a 36-bit fixed point division, and a fixed point subtraction, although the additions are floating point additions as described below.

Figure 5:
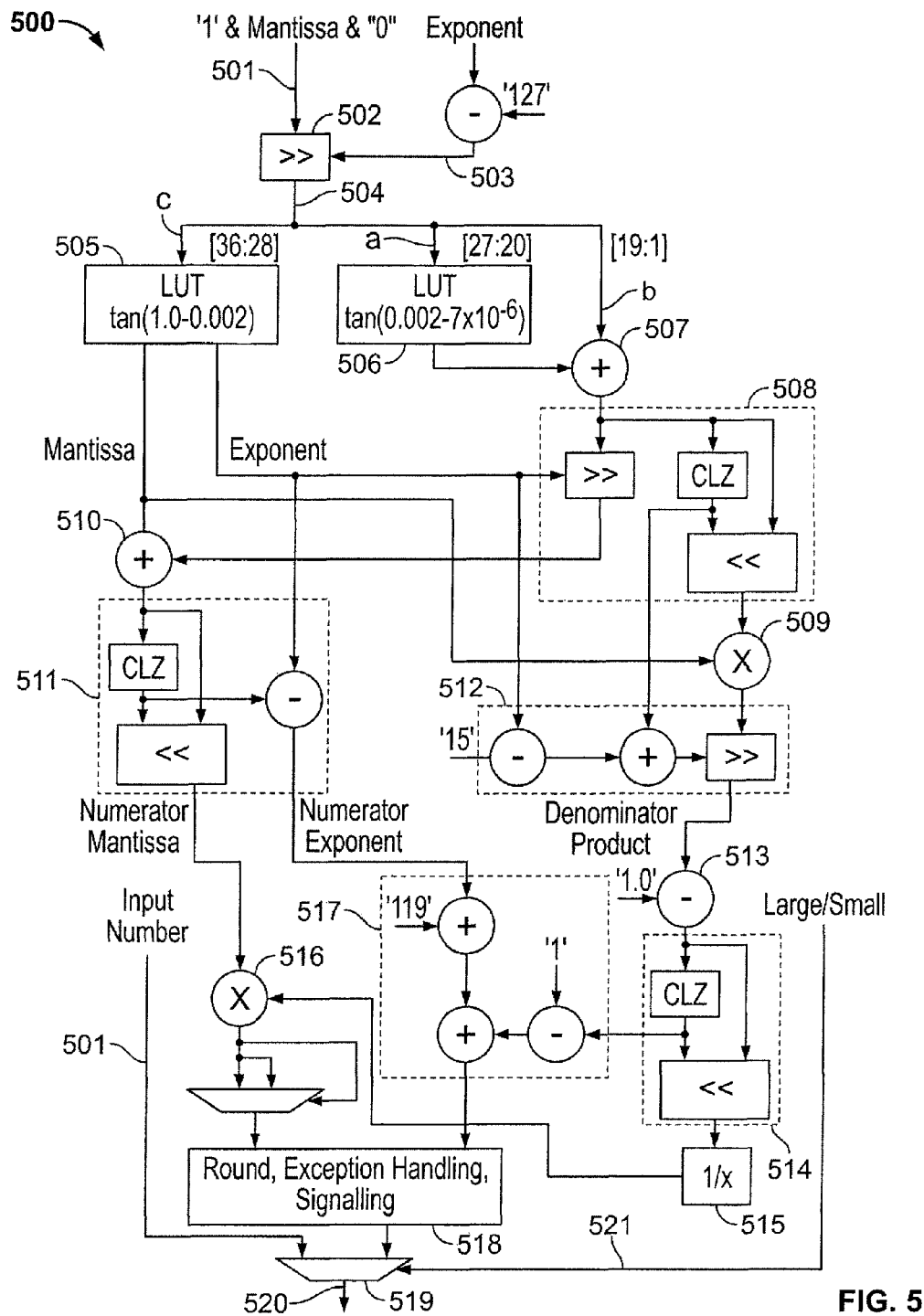
FIG. 5 shows an embodiment of an implementation for calculating tangent in accordance with the present invention.

An embodiment 500 of this tangent calculation is shown in FIG. 5 and may be implemented in circuitry.

The input value 501 (θ) is first converted to a 36-bit fixed-point number by shifting at 502 by the difference 503 between its exponent and 127 (the IEEE754-1985 exponent offset value). The converted fixed-point input 504 is then split into three numbers: c—bits [36:28], a—bits [27:20], and b—bits [19:1]. Tan(c) is determined in lookup table 505 and tan(a) is determined in lookup table 506. Tan(a) and b, which are both in fixed-point format, are added at 507. That sum must then be normalized to the exponent of c, which can range from 0 to 19 (127 to 146 in single precision offset equivalent). The 'tan (a)+b' sum has a maximum exponent of −8 (119 in single precision offset equivalent), and is normalized at 508 for multiplying by tan(c) at 509 (for the denominator) and adding to tan(c) at 510 (for the numerator).

The numerator is normalized at 511 and now exists as a floating-point number. The local exponent ('15'−'c exponent'+'a+b exponent') is a number that is relative to '1.0', and is used to denormalize the product to a fixed point number again at 512.

The denominator product is subtracted from '1' at 513. The difference is normalized at 514. The difference is then inverted at 515 to form the denominator.

The denominator is multiplied by the numerator at 516. Before that multiplication, the numerator exponent is normalized at 517. The exponent is '119' (which is the minimum value of c, or the maximum value of b—the reference point to which the internal exponents are normalized) plus the numerator exponent plus the denominator exponent. The denominator exponent is the shift value from the final denominator normalization 514—normally this would be considered a negative relative exponent, and subtracted from any final exponent. However, because the denominator is arithmetically inverted immediately following the normalization, the exponent is converted from negative to positive, and can therefore be added at this stage.

The result is rounded at 518 and is ready for use. However, if the exponent of the original input value 501 is less than 115, the output and the input are considered the same—i.e., tan(θ)=θ. This is implemented with the multiplexer 519, which selects as the final output either the rounded calculation result 520, or input 501, based on control signal 521 which is determined (not shown) by the size of the exponent of input 501.

Figure 6:
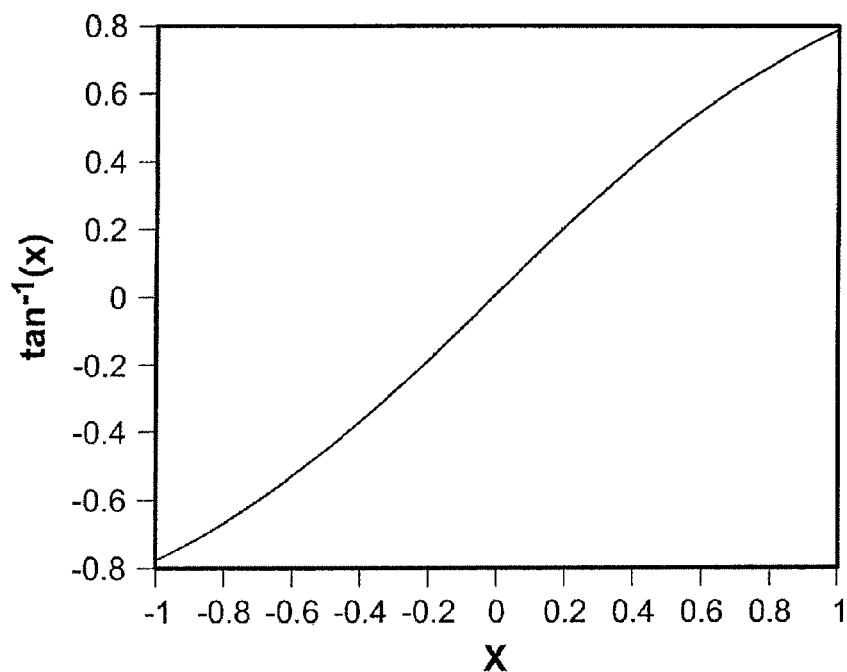
FIG. 6 shows a first range of the inverse tangent function.
Figure 7:
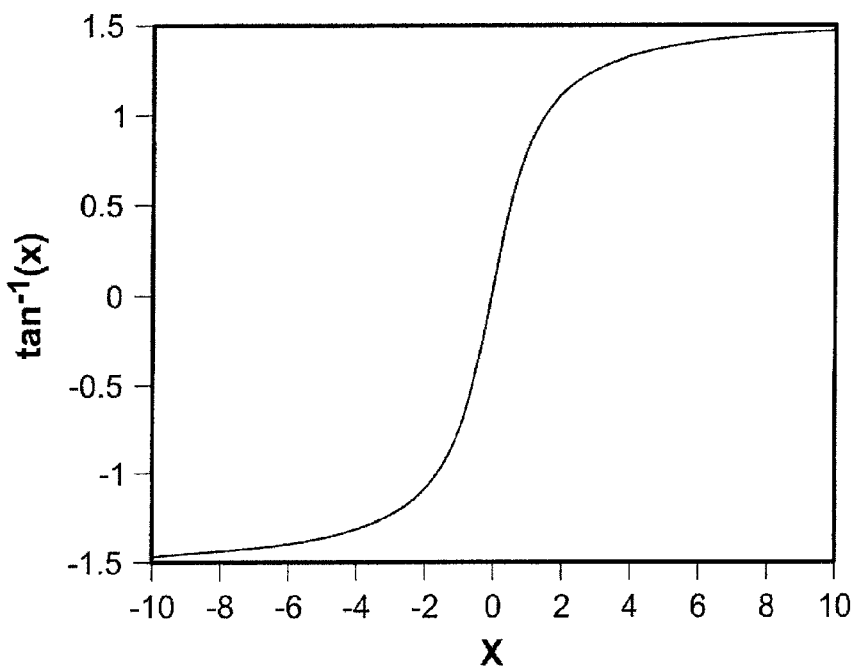
FIG. 7 shows a second range of the inverse tangent function.
Figure 8:
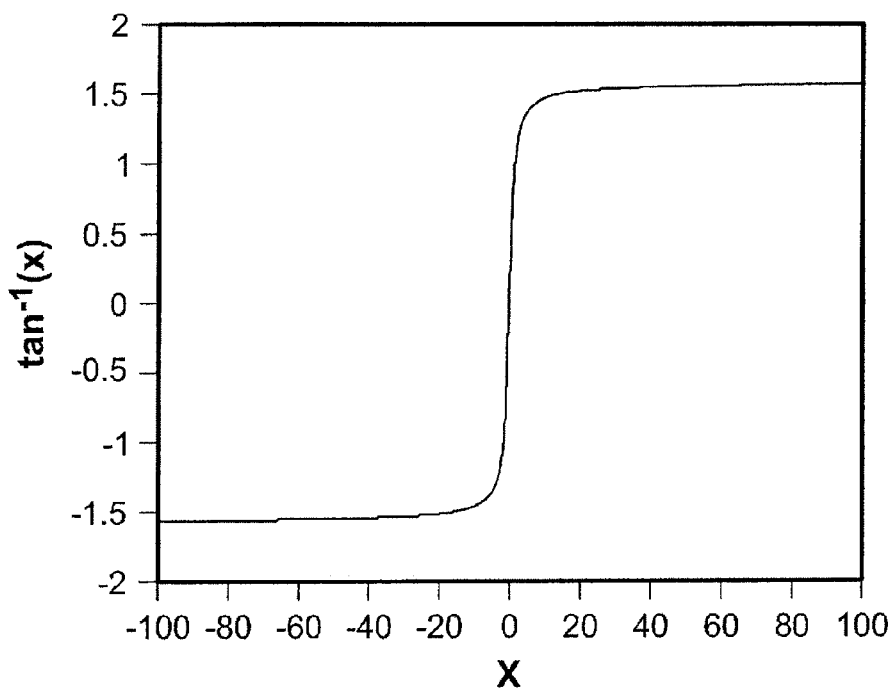
FIG. 8 shows a third range of the inverse tangent function.

For inverse tangent (i.e., arctan(x) or tan (x), the situation is reversed in that the input is between negative infinity and positive infinity, while the normalized or range-reduced output is −π/2≤θ≤π/2. Once again, the problem can be broken down into input ranges. Thus, as shown in FIG. 6, for −1≤x≤+ 1, arctan(x) is relatively linear, and has an output in the range −π/4≤θ≤π/4. Viewed on an intermediate scale in FIG. 7, for $-10_{10}\leq x\leq +10_{10}$, arctan(x) shows inflection points past ±1, flattening out to an output in the range −π/2≤θ≤π/2. Viewed on a larger scale in FIG. 8, for $-100_{10}\leq x\leq +100_{10}$, arctan(x) remains in an output range of −π/2≤θ≤π/2. In IEEE754-1985 single-precision arithmetic, with 24 bits of precision and an exponent up to 127, the output must be exact for a set of $8338608_{10}$ ($2^{23}$) points in 127 segments along the input curve.

The calculation can be simplified by separately handling inputs of magnitude less than 1 and inputs of magnitude greater than 1.

Considering first inputs of magnitude less than 1, the following identity may be applied:

$$\arctan(a) = \arctan(b) + \arctan\left(\frac{a-b}{1+ab}\right)$$

If b is close enough to a, then c=(a−b)/(1+ab) is very small and arctan(c)≈c. If a has a maximum value of 1, and b is made equal to the 8 or 10 most significant bits of a, then c will have a maximum value of ⅟256 for 8 bits, or ⅟1024 for 10 bits. The inverse tangent ⅟256 ($0.00390625_{10}$) is $0.00390623_{10}$. The error is almost at the floor of the precision of the input (23 bits). The inverse tangent of ⅟1024 ($0.0009765625_{10}$) is $0.000976522_{10}$, which has an error below the least significant bit of the input range.

The subrange b can easily be separated from a by truncation. The (a−b) term is made up of the truncated bits. ab will always be less than 1, so the term 1+ab can be calculated without an adder, by directly concatenating a '1' to the ab term. c can therefore be calculated easily. Values for arctan(b) where b<1 can be stored in a lookup table. Therefore, arctan (a) can be determined by looking up arctan(b) in the table and adding c to the lookup result.

If a is greater than (or equal to) 1, then the following identity can be used:

$$\arctan(a) = \frac{\pi}{2} - \arctan\left(\frac{1}{a}\right)$$

The inverse tangent of the inverse of the input may be determined as described above for inputs less than 1 and then the desired result is obtained by subtracting from π/2.

The input mantissa is converted to a 36-bit number, by appending a '1' to the left of the most significant bit, and appending a number of '0' bits to the right of the least significant bit. The exponent of this number is 127−(input_exponent−127)−1=253−input_exponent. Once the correct floating point input has been selected, the number is converted to a fixed point equivalent by right shifting it from the reference point of 1. This should not reduce accuracy of the result given that 36-bit numbers are used. If the number has an exponent of 117 (for a right shift of 10 bits), there will still be 26 valid bits in the 36-bit magnitude, and only 24 bits are needed for single-precision floating point representation.

Figure 9:
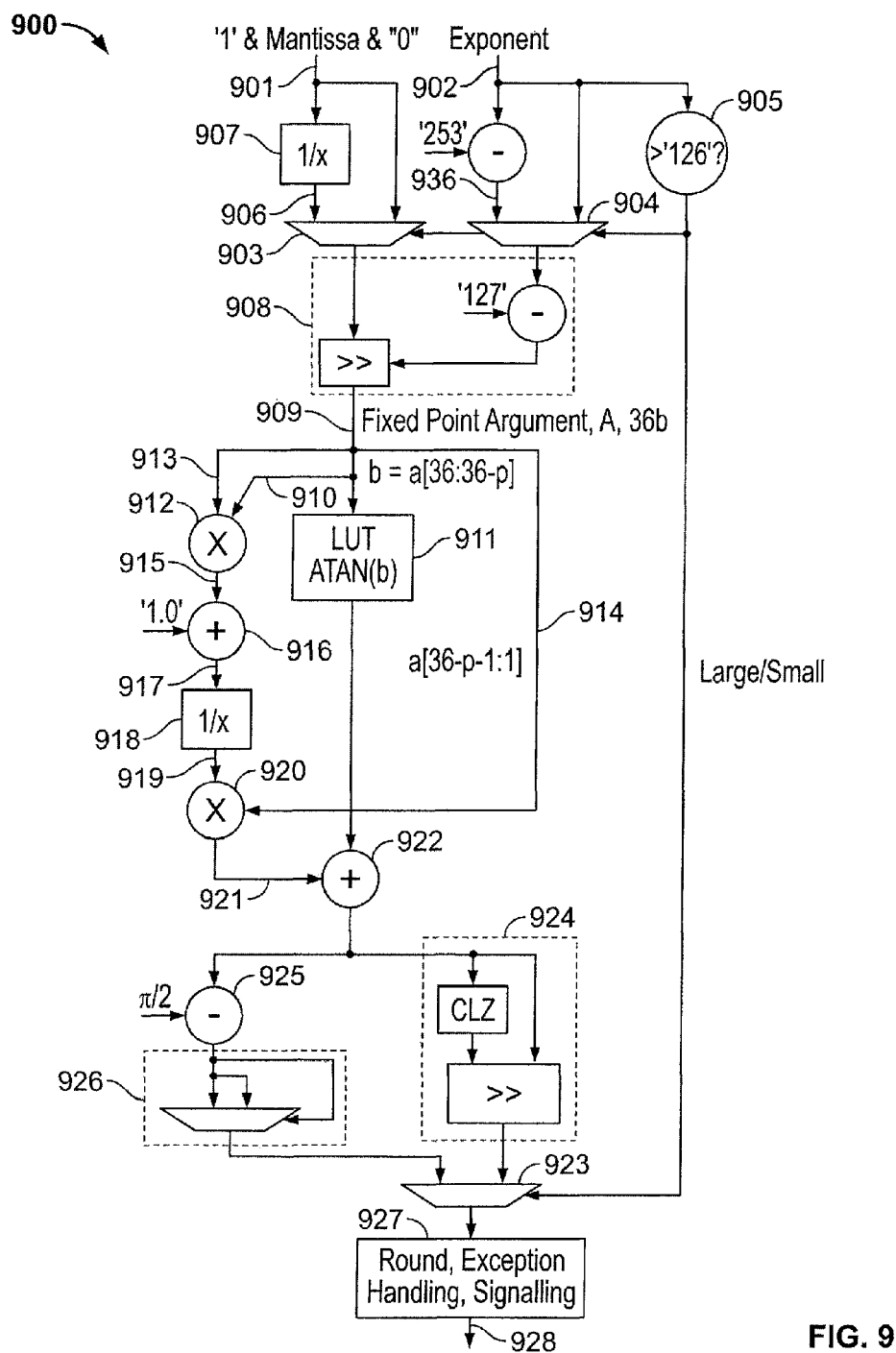
FIG. 9 shows an embodiment of an implementation for calculating inverse tangent in accordance with the present invention.

An embodiment 900 of this inverse tangent calculation is shown in FIG. 9 and may be implemented in circuitry.

The mantissa of the input number (with leading '1' and trailing zero(es) appended as discussed above is input at 901, while the exponent of the input number is input at 902. Multiplexers 903, 904 select the unaltered input mantissa and exponent if the input value is less than 1.0 as determined at 905. Otherwise, multiplexers 903, 904 select inverse 906 and the new exponent (original exponent subtracted from '253'). Inverse 906 can be computed using any suitable inverse calculation module 907. The input is then normalized at 908 to a fixed-point representation 909.

The uppermost bits 910 are input to lookup table 911 and are also input to multiplier 912 along with all bits 913—this is the ab calculation discussed above. a−b is the remaining bits 914.

The ab product 915 is added to '1' at 916 to form the 1+ab sum 917 which is inverted, again using any suitable inversion module 918 to form 1/(1+ab) quotient 919, which is multiplied at 920 by a−b term 914, forming the c term (a−b)/(1+ab). c term 921 is added at 922 to arctan(b) as determined in lookup table 911.

If the original input was less than '1', then sum 922 is the result, which is selected by control signal 905 at multiplexer 923 following normalization at 924. Sum 922 is also subtracted from π/2 at 925 and normalized at 926, and if the original input was greater than (or equal to) '1', then difference 925, as normalized at 926, is the result, which is selected by control signal 905 at multiplexer 923. Any necessary rounding, exception handling, etc., is performed at 927 to provide result 928.

In the input range of exponents 115-120 (as an example), some inaccuracies in the output (still limited to a small number of least significant bits) may occur. One way to solve this is to use a second, smaller lookup table (not shown) for a limited subset of most significant valid bits—e.g., 6 bits. The b value would be the upper 6 bits of the subrange, and the a−b value would be the lower 20 bits. To maintain the maximum amount of precision, the table could contain results that are normalized to the subrange—for example if the largest exponent in the subrange were 120, then $1.9999_{10} \times 2^{120}$ would be a fully normalized number, with all other table entries relative to that one. The c value would have to be left-shifted so that it would have the correct magnitude in relation to the b table output. One way (and possibly the most accurate way) to implement this would be to take the a−b value from before the fixed point shifter. That is, instead of fixed-point representation 909, the output of multiplexer 903 could be used directly. An additional multiplexer (not shown) could be provided to select between the output of multiplexer 903 for smaller exponents and the output of normalizer 908 for larger exponents.

Once inverse tangent can be calculated, inverse cosine and inverse sine can easily be calculated based on:

$$\arccos(x) = 2\arctan\left(\frac{1-x}{\sqrt{1-x^2}}\right)$$

and $$\arcsin(x) = \pi/2 - \arccos(x).$$

Figure 10:
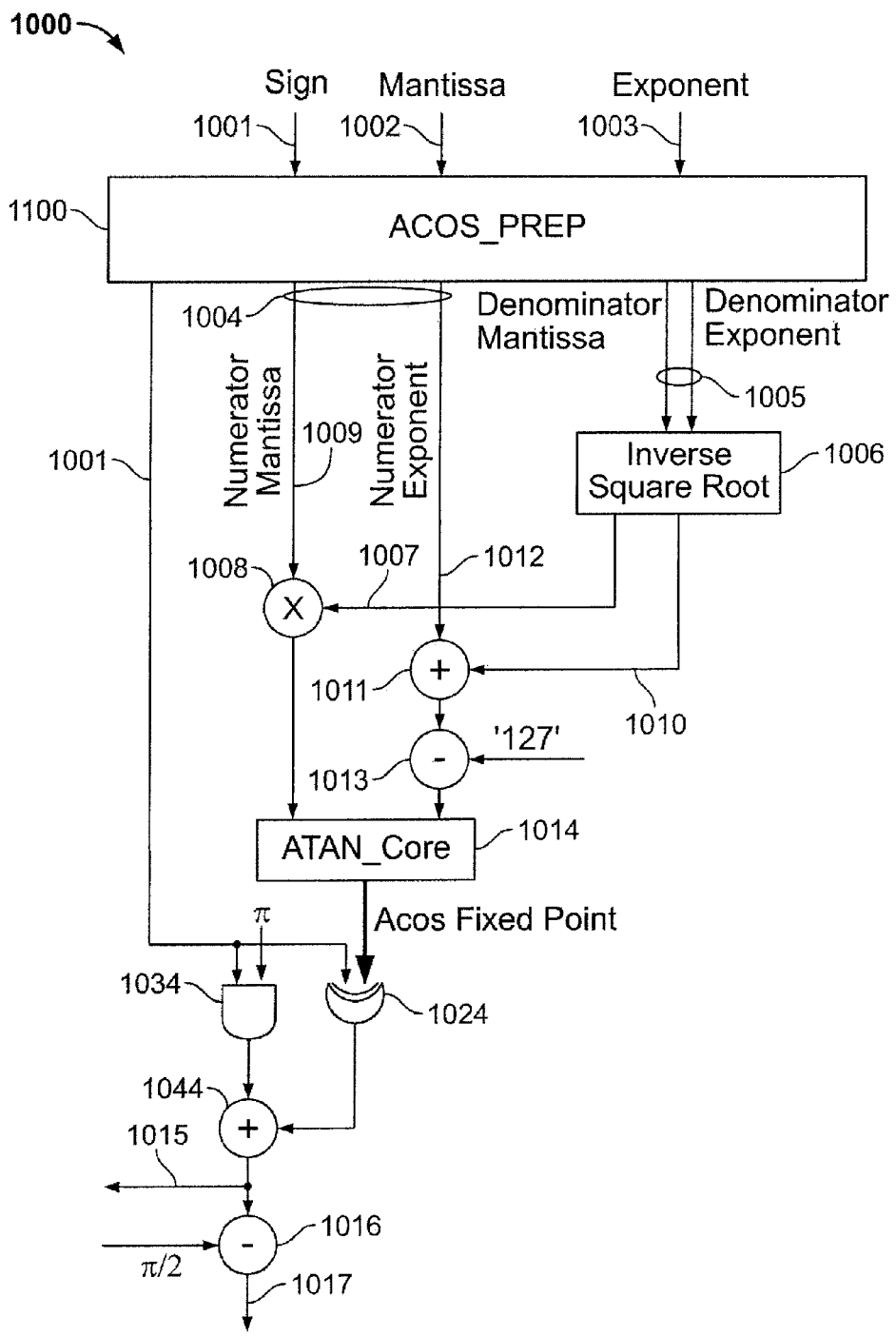
FIG. 10 shows a first portion of an embodiment of an implementation for calculating inverse cosine and/or inverse sine in accordance with the present invention.

An embodiment 1000 of the inverse cosine calculation is shown in FIG. 10 and may be implemented in circuitry.

Figure 11:
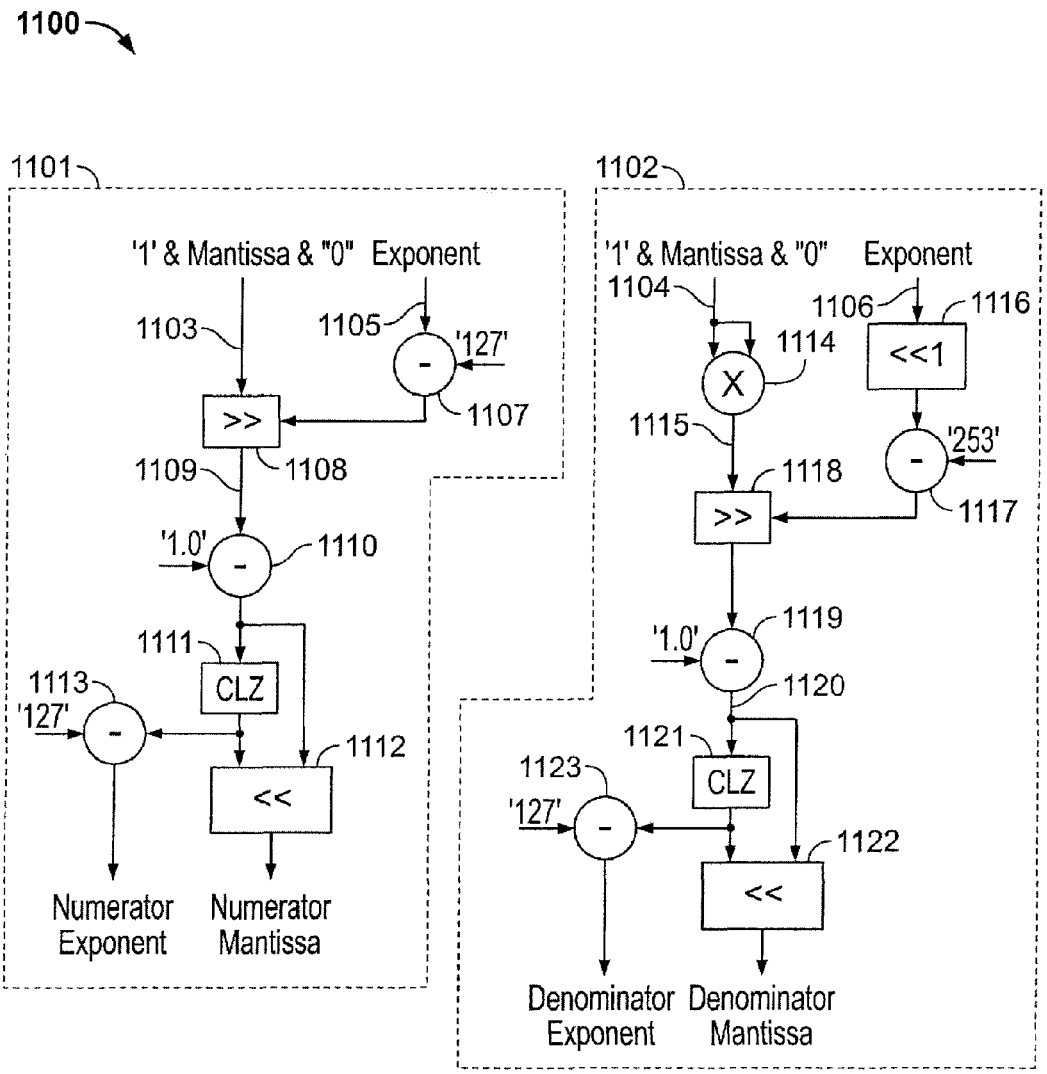
FIG. 11 shows a second portion of an embodiment of an implementation for calculating inverse cosine and/or inverse sine in accordance with the present invention.

The input argument x is input as sign 1001, mantissa 1002 and exponent 1003 to preprocessing module 1100, shown in more detail in FIG. 11. Preprocessing module 1100 prepares the 1−x numerator term 1004 and the $1-x^2$ denominator term 1005 from x. The inverse square root of denominator term 1005 is taken at inverse square root module 1006, which be any suitable inverse square root module.

The mantissa 1007 of the inverse square root is multiplied at 1008 by the mantissa 1009 of the numerator term, while the exponent 1010 of the inverse square root is added at 1011 to the exponent 1012 of the numerator term, and '127' is subtracted from the exponent at 1013. The result is input to an inverse tangent module 1014 which may be inverse tangent module 900, above.

The inverse tangent module 1014 outputs a 36-bit fixed point value between 0 and π/2. If the input number is positive, the inverse cosine of that input must lie in the first (or fourth) quadrant, and the output of inverse tangent module 1014 is used directly. This is implemented by exclusive-OR gate 1024 and AND-gate 1034. Sign bit 1001 will be a '0', meaning that XOR gate 1024 will pass the output of inverse tangent module 1014 without change, and there will be no contribution at adder 1044 from AND-gate 1034. If the input number is negative, the inverse cosine of that input must lie in the second (or third) quadrant. In that case, the inverse cosine value can be calculated by subtracting the output of inverse tangent module 1014 from π. Sign bit 1001 will be a '1', meaning that XOR gate 1024 will pass the 1's-complement negative of the output of inverse tangent module 1014, while AND-gate 1034 will pass the value π. The sign bit is also used as a carry input (not shown) to adder 1044, converting the 1's-complement number to 2's-complement format, and adder 1044 outputs the difference between π and the output of inverse tangent module 1014.

Output 1015 is the inverse cosine. By subtracting inverse cosine output 1015 from π/2 at 1016, inverse sine 1017 can be determined. However, for inputs having real exponents less than −12 (IEEE754-1985 exponents less than 115), it would be more accurate to rely on arcsin(x)≈x than to rely on the calculated value.

FIG. 11 shows preprocessing module 1100, including numerator portion 1101 and denominator portion 1102. The input mantissa (with leading '1' and trailing zero(es)) is input to numerator portion 1101 at 1103 and to denominator portion 1102 at 1104, while the input exponent is input to numerator portion 1101 at 1105 and to denominator portion 1102 at 1106.

On the numerator side, '127' is subtracted from the exponent at 1107 to determine the "real" exponent, which is then used in shifter 1108 to turn the input mantissa into a fixed-point number 1109, which is subtracted at 1110 from '1' to yield the numerator 1−x. The number of leading zeroes in the result are counted at count-leading-zeroes module 1111 and used at shifter 1112 to normalize the numerator mantissa and at subtractor 1113 to determine the IEEE754-1985 exponent by subtracting from '127'.

On the denominator side, the input mantissa is multiplied by itself at multiplier 1114 to determine $x^2$ value 1115. The input exponent is left-shifted by one place at 1116 and subtracted from '253' at 1117 to determine how far to right-shift value 1115 at 1118 to yield a fixed-point representation of $x^2$. The fixed-point representation of $x^2$ is subtracted from '1' at 1119 to yield denominator $1-x^2$ at 1120. The number of leading zeroes in value 1120 are counted at count-leading-zeroes module 1121 and used at shifter 1122 to normalize the denominator mantissa and at subtractor 1123 to determine the IEEE754-1985 exponent by subtracting from '127'.

The trigonometric function calculating structures described above can be implemented as dedicated circuitry or can be programmed into programmable integrated circuit devices such as FPGAs. As discussed, in FPGA implementations, certain portions of the circuitry, particularly involving multiplications and combinations of multiplications as indicated, can be carried out in specialized processing blocks of the FPGA, such as a DSP block, if provided in the FPGA.

Instructions for carrying out a method according to this invention for programming a programmable device to implement the trigonometric function calculating structures described above may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 12:
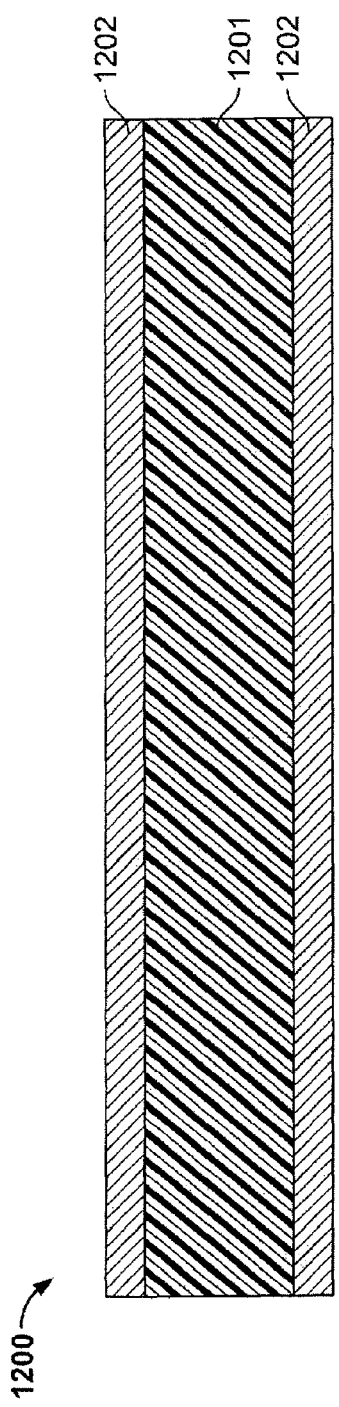
FIG. 12 is a cross-sectional view of a magnetic data storage medium encoded with a set of machine-executable instructions for performing the method according to the present invention.

FIG. 12 presents a cross section of a magnetic data storage medium 1200 which can be encoded with a machine executable program that can be carried out by systems such as the aforementioned personal computer, or other computer or similar device. Medium 1200 can be a floppy diskette or hard disk, or magnetic tape, having a suitable substrate 1201, which may be conventional, and a suitable coating 1202, which may be conventional, on one or both sides, containing magnetic domains (not visible) whose polarity or orientation can be altered magnetically. Except in the case where it is magnetic tape, medium 1200 may also have an opening (not shown) for receiving the spindle of a disk drive or other data storage device.

The magnetic domains of coating 1202 of medium 1200 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 13:
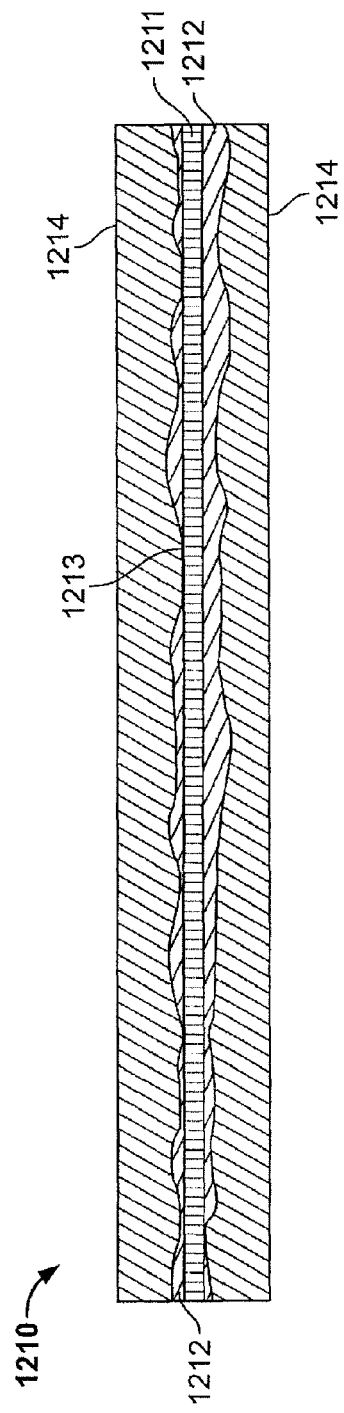
FIG. 13 is a cross-sectional view of an optically readable data storage medium encoded with a set of machine executable instructions for performing the method according to the present invention.

FIG. 13 shows a cross section of an optically-readable data storage medium 1210 which also can be encoded with such a machine-executable program, which can be carried out by systems such as the aforementioned personal computer, or other computer or similar device. Medium 1210 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1210 preferably has a suitable substrate 1211, which may be conventional, and a suitable coating 1212, which may be conventional, usually on one or both sides of substrate 1211.

In the case of a CD-based or DVD-based medium, as is well known, coating 1212 is reflective and is impressed with a plurality of pits 1213, arranged on one or more layers, to encode the machine-executable program. The arrangement of pits is read by reflecting laser light off the surface of coating 1212. A protective coating 1214, which preferably is substantially transparent, is provided on top of coating 1212.

In the case of magneto-optical disk, as is well known, coating 1212 has no pits 1213, but has a plurality of magnetic domains whose polarity or orientation can be changed magnetically when heated above a certain temperature, as by a laser (not shown). The orientation of the domains can be read by measuring the polarization of laser light reflected from coating 1212. The arrangement of the domains encodes the program as described above.

Figure 14:
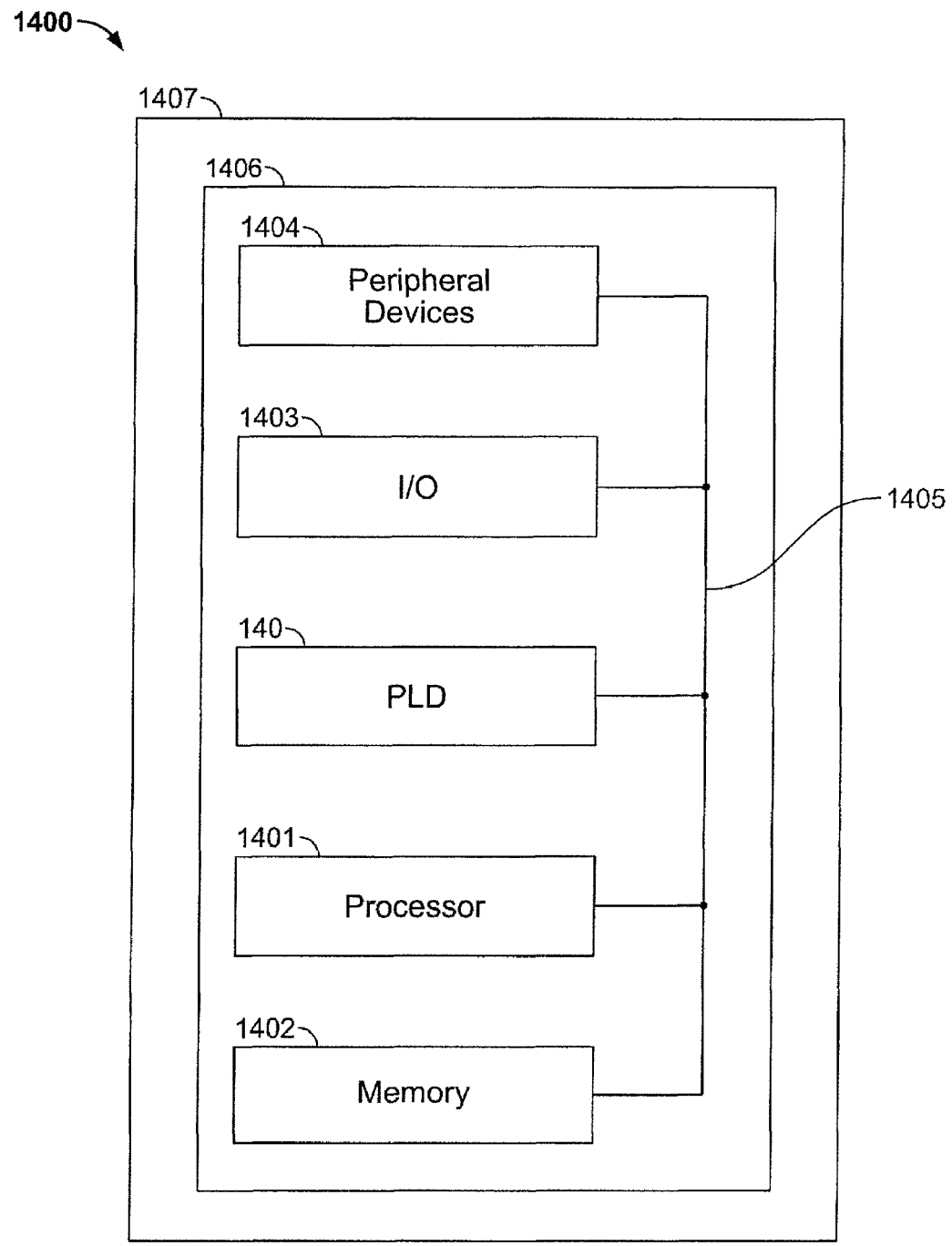
FIG. 14 is a simplified block diagram of an illustrative system employing a programmable logic device incorporating the present invention.

A PLD 140 programmed according to the present invention may be used in many kinds of electronic devices. One possible use is in a data processing system 1400 shown in FIG. 14. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

System 1400 can be used in a wide variety of applications, such as computer networking, data networking, instrumentation, video processing, digital signal processing, or any other application where the advantage of using programmable or reprogrammable logic is desirable. PLD 140 can be used to perform a variety of different logic functions.

For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400. It should be noted that system 1400 is only exemplary, and that the true scope and spirit of the invention should be indicated by the following claims.

Various technologies can be used to implement PLDs 140 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for computing an inverse tangent function of an input, said circuitry comprising:
  circuitry for determining a relationship of said input to '1' to generate an intermediate value;
  circuitry for multiplying said intermediate value by upper bits of said intermediate value to form a first product, to add said first product to '1' to form a first sum, and to invert said first sum to form a first intermediate result;
circuitry for multiplying lower bits of said intermediate value by said first intermediate result to form a second intermediate result;
look-up table circuitry for determining a third intermediate result from said upper bits of said intermediate value;
circuitry for adding said second intermediate result and said third intermediate result to form a preliminary result; and
circuitry for deriving a final result from said preliminary result based on said relationship of said input to '1'.

2. The circuitry of claim 1 wherein:
said circuitry for determining a relationship of said input to '1' to generate an intermediate value comprises circuitry for comparing said input to '1' and for inverting said input for said input being greater than '1' and passing through said input for said input being at most equal to '1'.

3. The circuitry of claim 2 wherein said circuitry for determining further comprises circuitry for normalizing said intermediate value.

4. The circuitry of claim 2 wherein, for an input having an exponent in a selected range of exponents, said look-up table circuitry operates on a limited number of most significant bits of said input.

5. The circuitry of claim 4 wherein said look-up table circuitry comprises a second look-up table that operates on said limited number of most significant bits of said input.

6. The circuitry of claim 4 wherein said limited number is 6.

7. The circuitry of claim 4 wherein values in said look-up table circuitry are normalized to said selected range of exponents.

8. The circuitry of claim 4 further comprising circuitry to normalize said second intermediate result to a selected range of exponents before being added to output of said look-up table circuitry for said input having an exponent in said selected range of exponents.

9. The circuitry of claim 2 wherein:
said circuitry for deriving said final result from said preliminary result subtracts said preliminary result from $\pi/2$ for said input being greater than '1' and passes through said preliminary result for said input being at most equal to '1'.

10. The circuitry of claim 9 wherein said circuitry for deriving said final result from said preliminary result normalizes said final result.

11. The circuitry of claim 2 wherein said circuitry for multiplying said intermediate value by upper bits of said intermediate value to form a first product, to add said first product to '1' to form a first sum, and to invert said first sum to form a first intermediate result, adds said first product to '1' using a non-arithmetic operation.

12. The circuitry of claim 11 wherein said non-arithmetic operation is concatenation.

13. A method of configuring a programmable integrated circuit device as circuitry for computing an inverse tangent function of an input, said method comprising:
configuring logic of said programmable integrated circuit device as circuitry for determining a relationship of said input to '1' to generate an intermediate value;
configuring logic of said programmable integrated circuit device as circuitry for multiplying said intermediate value by upper bits of said intermediate value to form a first product, to add said first product to '1' to form a first sum, and to invert said first sum to form a first intermediate result;
configuring logic of said programmable integrated circuit device as circuitry for multiplying lower bits of said intermediate value by said first intermediate result to form a second intermediate result;
configuring logic of said programmable integrated circuit device as look-up table circuitry for determining a third intermediate result from said upper bits of said intermediate value;
configuring logic of said programmable integrated circuit device as circuitry for adding said second intermediate result and said third intermediate result to form a preliminary result; and
configuring logic of said programmable integrated circuit device as circuitry for deriving a final result from said preliminary result based on said relationship of said input to '1'.

14. The method of claim 13 wherein:
said configuring logic of said programmable integrated circuit device as circuitry for determining a relationship of said input to '1' to generate an intermediate value comprises configuring logic of said programmable integrated circuit device as circuitry for comparing said input to '1' and for inverting said input for said input being greater than '1' and passing through said input for said input being at most equal to '1'.

15. The method of claim 14 wherein said configuring logic of said programmable integrated circuit device as circuitry for determining further comprises configuring logic of said programmable integrated circuit device as circuitry for normalizing said intermediate value.

16. The method of claim 14 wherein said configuring logic of said programmable integrated circuit device as said look-up table circuitry comprises configuring said look-up table circuitry to operate on a limited number of most significant bits of said input for said input having an exponent in a selected range of exponents.

17. The method of claim 16 wherein said configuring said look-up table circuitry to operate on a limited number of most significant bits of said input for said input having an exponent in a selected range of exponents comprises configuring said look-up table circuitry with a second look-up table that operates on said limited number of most significant bits of said input.

18. The method of claim 16 wherein said limited number is 6.

19. The method of claim 16 wherein said configuring logic of said programmable integrated circuit device as said second look-up table comprises configuring said second look-up table with values normalized to said selected range of exponents.

20. The method of claim 16 further comprising configuring logic of said programmable integrated circuit device to normalize said second intermediate result to a selected range of exponents before being added to output of said look-up table circuitry for said input having an exponent in said selected range of exponents.

21. The method of claim 14 wherein:
said configuring logic of said programmable integrated circuit device as circuitry for deriving said final result from said preliminary result comprises configuring logic of said programmable integrated circuit device to subtract said preliminary result from $\pi/2$ for said input being greater than '1' and to pass through said preliminary result for said input being at most equal to '1'.

22. The method of claim 21 wherein said configuring logic of said programmable integrated circuit device as circuitry for deriving said final result from said preliminary result comprises configuring logic of said programmable integrated circuit device to normalize said final result.

23. The method of claim 14 wherein said configuring logic of said programmable integrated circuit device as circuitry for multiplying said intermediate value by upper bits of said intermediate value to form a first product, to add said first product to '1' to form a first sum, and to invert said first sum to form a first intermediate result, comprises configuring logic of said programmable integrated circuit device to add said first product to '1' using a non-arithmetic operation.

24. The method of claim 23 wherein said non-arithmetic operation is concatenation.

25. A non-transitory machine-readable data storage medium encoded with non-transitory machine-executable instructions for configuring a programmable integrated circuit device as circuitry for computing an inverse tangent function of an input, said instructions comprising:
   instructions to configure logic of said programmable integrated circuit device as circuitry for determining a relationship of said input to '1' to generate an intermediate value;
   instructions to configure logic of said programmable integrated circuit device as circuitry for multiplying said intermediate value by upper bits of said intermediate value to form a first product, to add said first product to '1' to form a first sum, and to invert said first sum to form a first intermediate result;
   instructions to configure logic of said programmable integrated circuit device as circuitry for multiplying lower bits of said intermediate value by said first intermediate result to form a second intermediate result;
   instructions to configure logic of said programmable integrated circuit device as a look-up table for determining a third intermediate result from said upper bits of said intermediate value;
   instructions to configure logic of said programmable integrated circuit device as circuitry for adding said second intermediate result and said third intermediate result to form a preliminary result; and
   instructions to configure logic of said programmable integrated circuit device as circuitry for deriving a final result from said preliminary result based on said relationship of said input to '1'.

26. The machine-readable data storage medium of claim 25 wherein:
   said instructions to configure logic of said programmable integrated circuit device as circuitry for determining a relationship of said input to '1' to generate an intermediate value comprise instructions to configure logic of said programmable integrated circuit device as circuitry for comparing said input to '1' and for inverting said input for said input being greater than '1' and passing through said input for said input being at most equal to '1'.

27. The machine-readable data storage medium of claim 26 wherein said instructions to configure logic of said programmable integrated circuit device as circuitry for determining further comprise instructions to configure logic of said programmable integrated circuit device as circuitry for normalizing said intermediate value.

28. The machine-readable data storage medium of claim 26 wherein said instructions to configure logic of said programmable integrated circuit device as said look-up table comprise instructions to configure said look-up table to operate on a limited number of most significant bits of said input for said input having an exponent in a selected range of exponents.

29. The method of claim 28 wherein said instructions to configure said look-up table to operate on a limited number of most significant bits of said input for said input having an exponent in a selected range of exponents comprise instructions to configure a second look-up table that operates on said limited number of most significant bits of said input.

30. The machine-readable data storage medium of claim 28 wherein said limited number is 6.

31. The machine-readable data storage medium of claim 28 wherein said instructions to configure logic of said programmable integrated circuit device as said look-up table comprise instructions to configure said look-up table with values normalized to said selected range of exponents.

32. The machine-readable data storage medium of claim 28 further comprising instructions to configure logic of said programmable integrated circuit device to normalize said second intermediate result to a selected range of exponents before being added to output of said look-up table circuitry for said input having an exponent in said selected range of exponents.

33. The machine-readable data storage medium of claim 26 wherein:
   said instructions to configure logic of said programmable integrated circuit device as circuitry for deriving said final result from said preliminary result comprise instructions to configure logic of said programmable integrated circuit device to subtract said preliminary result from $\pi/2$ for said input being greater than '1' and to pass through said preliminary result for said input being at most equal to '1'.

34. The machine-readable data storage medium of claim 33 wherein said instructions to configure logic of said programmable integrated circuit device as circuitry for deriving said final result from said preliminary result comprise instructions to configure logic of said programmable integrated circuit device to normalize said final result.

35. The machine-readable data storage medium of claim 26 wherein said instructions to configure logic of said programmable integrated circuit device as circuitry for multiplying said intermediate value by upper bits of said intermediate value to form a first product, to add said first product to '1' to form a first sum, and to invert said first sum to form a first intermediate result, comprise instructions to configure logic of said programmable integrated circuit device to add said first product to '1' using a non-arithmetic operation.

36. The machine-readable data storage medium of claim 35 wherein said non-arithmetic operation is concatenation.

* * * * *